Figures 1, 2:
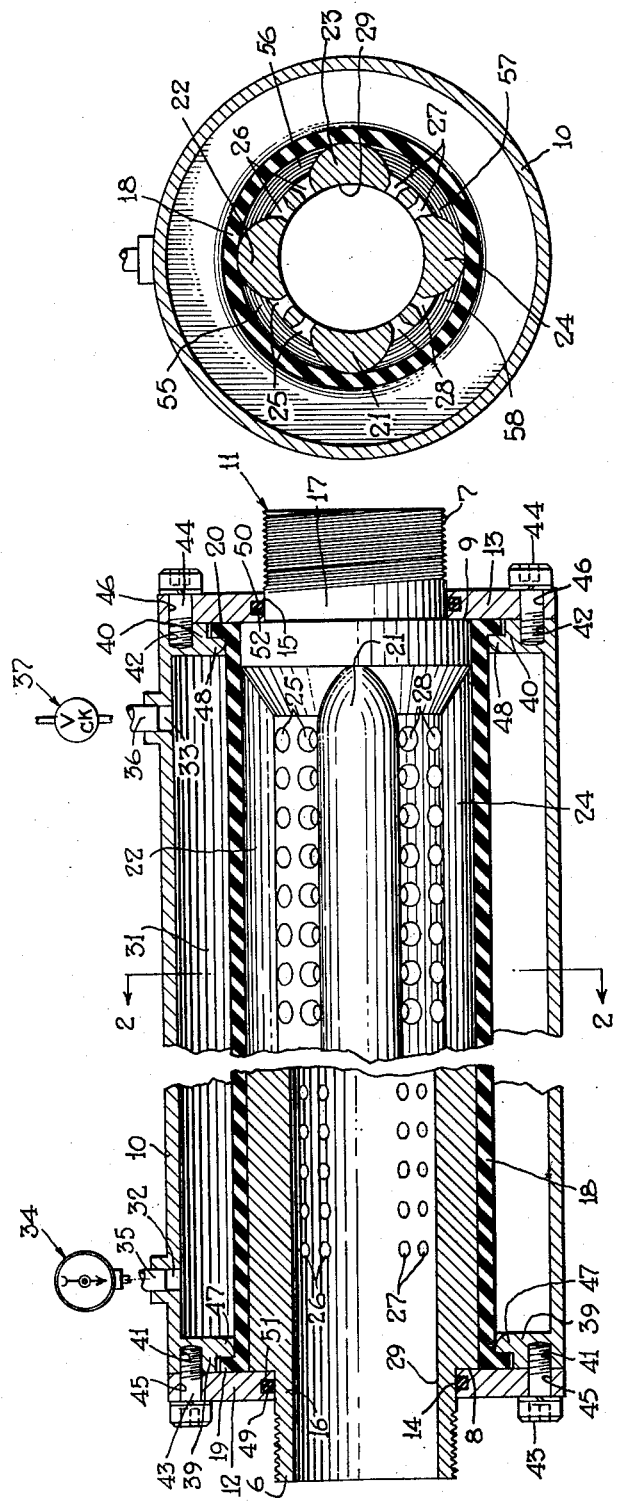

INVENTOR.
Jerome R. Pier
BY
ATTORNEY

United States Patent Office 2,841,180
Patented July 1, 1958

2,841,180

PULSATION DAMPENER DEVICE AND MANDREL FOR USE THEREIN

Jerome R. Pier, Irwin, Pa., assignor to Westinghouse Air Brake Company, Wilmerding, Pa., a corporation of Pennsylvania Application November 25, 1955, Serial No. 549,021

4 Claims. (Cl. 138—30)

This invention relates to devices for dampening, absorbing or suppressing undesired pressure pulsations or surges in fluid systems, and more particularly to such devices of the type employing a mandrel and resilient means associated therewith and adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low cycle or low frequency surges of high volume or intensity; centrifugal and rotary pumps may have in their fluid output low volume surges occurring at a high frequency. In addition to these periodic surges, shock waves may be generated in any fluid flow system where the fluid is subject to sudden deceleration, such for example as that caused by closing a valve against a moving column of fluid. The closing of such a valve may result in the generation of surges or shock waves of high intensity, which may result in damage to pipe lines and in undesirable noises frequently known as "water hammer."

It is old in the art to suppress and dampen these surges and shock waves by connecting in the fluid line a mandrel or section of pipe having therein a number of perforations or throttling orifices, this perforated section of pipe or mandrel being surrounded by a resilient sleeve of rubber or other suitable resilient material. Sudden increases of pressure in the fluid in the line cause the fluid to flow through the perforations into the space between the sleeve and the line or mandrel, thereby "taking up" or absorbing the excess pressure. When the pressure in the line returns to normal, the fluid between the sleeve and the line is discharged through the openings or perforations back into the line. In some prior art devices, the sleeve itself is surrounded by a chamber of resilient material, such for example as air under pressure, to insure the rapid collapse of the sleeve or return to its former position, and discharge of fluid back into the line, when the line pressure falls to normal or below after the surge has passed.

It has been found that the useful life of resilient sleeves in such devices is limited by the wear resulting from contact and friction between the sleeve and pipe section, particularly when the sleeve collapses against the pipe, and also to some extent when the sleeve is distended by fluid pressure in the line and may make contact with the walls of the surrounding chamber.

Furthermore, the sleeve may be stretched beyond its limit of elasticity by the fluid intake during the surge, so that the sleeve does not return to normal, or its former position, when the pressure decreases, with the result that undesired stresses and strains occur in the material of the sleeve, resulting in its ultimate rupture, and possibly reducing its effectiveness as a surge absorbing element. Also, sharp folds in the sleeve may occur when it collapses after the surge has passed.

The apparatus of the subject invention is adapted to reduce to a minimum wear or damage to the resilient sleeve of both the before-named varieties. It accomplishes this object by the provision of a perforated pipe section in the form of a mandrel having a plurality of outside ridges or lobes spaced around the periphery thereof, and preferably running substantially parallel to the longitudinal axis of the mandrel. The fluid flows through rows of openings or perforations located in the mandrel between the ridges. The resilient sleeve may normally be of such a diameter as to, in a free or undistended condition, rest in contact with the tops or peaks of the ridges or lobes, which are rounded to reduce frictional contact with the sleeve. When the sleeve collapses, it does so along the curved surfaces of the mandrel, without sharp folds occurring therein. Enlargement of the volume between the inside of the sleeve and the entire outer surface of the mandrel in response to increases in pressure in the fluid is accomplished with very little, if any, stretching of the resilient sleeve itself.

Accordingly, it is a primary object of this invention to provide new and improved surge absorbing and pulsation dampening apparatus characterized by long and trouble-free life.

Another object is to provide surge absorbing and pulsation dampening apparatus characterized by substantially constant high efficiency over its entire lifetime.

Another object is to provide new and improved surge absorbing apparatus of the type employing a resilient sleeve, in which wear of the sleeve is reduced to a minimum.

Another object is to provide new and improved surge absorbing apparatus of the type employing a resilient sleeve supported by a mandrel in which contact between the sleeve and mandrel is reduced to a minimum.

Still another object is to provide new and improved surge absorbing apparatus of the type employing a resilient sleeve supported by a mandrel in which the volume between the sleeve and mandrel may vary within wide limits without substantial stretching of the sleeve.

A further object is to provide a new and improved mandrel for use in surge absorbing apparatus of the type employing a resilient sleeve supported by a mandrel.

Still a further object is to provide a new and improved mandrel for use in surge absorbing and pulsation dampening apparatus of the type employing a resilient sleeve supported by a mandrel in which the mandrel is so shaped as to reduce contact with the sleeve to a minimum.

Other objects and advantages will become apparent after a perusal of the following specification when studied in connection with the accompanying drawings, in which:

Fig. 1 is a sectional view of the pulsation dampener apparatus substantially along the longitudinal axis thereof; and Fig. 2 is a cross-sectional view taken along the line 2—2 of Fig. 1.

Referring now to the drawings for a more detailed understanding of the invention, and in which like reference numerals are used throughout to designate like parts, there is shown a mandrel generally designated by the reference numeral 11. The mandrel 11 may have threaded ends 6 and 7 for connecting it in a pipeline carrying a fluid under pressure, but it is to be understood that any other suitable means could be employed, such for example as flanged pipe or coupling members bolted or otherwise secured to end plates 12 and 13. Fluid from which the surges are to be removed may flow through the central passageway or bore 29, Fig. 2, of the mandrel. Whereas for convenience of illustration only, the modification of the invention is shown in which the fluid flows through the mandrel, it should be understood that one end of the apparatus of Fig. 1 may be closed, the other end communicating with the fluid line by any suitable and convenient means, such for example as a T-joint in the line.

The mandrel 11 has in the working portion thereof, a series of raised ridges or lobes spaced around the periphery thereof. Whereas a mandrel having four lobes is shown, it is to be understood that the invention is not limited to a mandrel having four lobes, and that any convenient and suitable number might be used. The four lobes are designated by the reference numerals 21, 22, 23 and 24 respectively, Fig. 2, and the mandrel has therein rows of perforations between the lobes, the rows of perforations being arranged in pairs, the pairs being designated 25, 26, 27 and 28, respectively. The perforations are preferably tapered for at least portions of their lengths, as apparent in the drawings, to provide optimum throttling action. Whereas dual rows of perforations are shown between ridges, it is to be understood that single rows could be utilized, if desired, and whereas at least one row is shown between each pair of adjacent lobes or ridges, it is to be understood that the number of rows of perforations is incidental.

Aforementioned end plates or discs 12 and 13 have bores 14 and 15 therein respectively for receiving the unthreaded portions 16 and 17 of the ends of the mandrel 11, the end plates 12 and 13 fitting snugly against annular surfaces or shoulders 8 and 9 of the mandrel. If desired, end plates 12 and 13 may have grooves 49 and 50 respectively in the bores 14 and 15 thereof respectively for housing a pair of ring seals or packing rings 51 and 52 respectively. If desired, one or both of the end plates 12 and 13 may be secured to mandrel end portions 16 and 17 respectively by welding, or any other convenient means, such as screw-threading.

End plate 12 has bores 45 therein, and end plate 13 has bores 46 therein, for receiving pluralities of bolts 43 and 44 respectively, which have the threaded ends thereof in engagement with threaded bores 41 and 42 respectively of inwardly flaring end ribs 39 and 40 respectively of a housing or casing 10, which may be generally cylindrical in shape. Aforementioned end ribs 39 and 40 have inwardly extending annular lips 47 and 48 respectively which firmly secure the flanged ends 19 and 20 respectively of resilient sleeve 18 to end plates 12 and 13 respectively, compression of the flanged ends of the sleeve 18 providing sealing means between the sleeve and mandrel, between the sleeve and end plates 12 and 13, and between the sleeve and end ribs 39 and 40, although additional sealing means may be added if desired. Resilient sleeve 18 may be made of any suitable material, such for example as rubber, and in the "free" state thereof its inside diameter is such that the sleeve fits snugly over the peaks of the ridges 21, 22, 23 and 24.

The housing 10 with its aforementioned end ribs 39 and 40 forms with the resilient sleeve 18 an enclosed chamber 31. Valve 37 and pipe 36 entering bore 33 of casing or housing 10, provide a means for bringing fluid under pressure, for example, compressed air, into the chamber 31, to exert a force inwardly on the sleeve 18. Bore 32 of cylinder 10 has a pipe 35 in screw-threaded engagement therein leading to a pressure gauge generally designated 34. The chamber 31 may be charged to any preselected pressure.

In the operation of the above-described apparatus, in a first mode or condition of operation, assume by way of illustration that the chamber is charged to the normal pressure of the fluid line. The fluid in the line flows from bore 29 through the rows of orifices 25, 26, 27 and 28 into the volumes 55, 56, 57 and 58 respectively, Fig. 2, between the outer surface of the mandrel and the inner surface of the sleeve 18. Since the fluid pressures on both sides of sleeve 18 are substantially equal, the sleeve 18 may assume its normal or "free" position, such as that shown in Fig. 2, where the sleeve is in its normal, rounded condition and the inner surface of the sleeve rests upon the rounded tops of lobes or ridges 21, 22, 23 and 24.

During pulses of pressure in the line, fluid is forced outward through the orifices and the sleeve 18 stretches and expands circumferentially against the pressure in chamber 31 so that the inner surface of the sleeve may no longer make contact with the ridges. During rarefactions or dips in line pressure below normal after surges or peaks, the portions of the sleeve 18 between the lobes are forced inward toward the surface of the mandrel and may engage it.

Under a second and different condition, or mode of operation, assume that the pressure in chamber 31 is increased somewhat over the normal line pressure. The portions of the sleeve 18 between the tops of the ridges are depressed inwardly toward the surface of the mandrel, reducing the volumes 55, 56, 57 and 58. Assume now that recurring pulses of pressure occur in the line. Depending upon the amplitude of the pulses relative to the size of the rarefactions and upon the duration of the peaks relative to the duration of the rarefactions or dips, the sleeve may assume a normal or average position whereat the volumes 55, 56, 57 and 58 are reduced to substantially one-half the values they had while the sleeve was in rounded or "free" position. This may be the preferred condition of operation of the device, where engineering considerations make it feasible. Then, surges of pressure in the fluid line and bore 29 force additional fluid through the orifices, forcing the sleeve 18 back against the pressure in chamber 31 to, for example, the position shown in Fig. 2, but not stretching the sleeve. During the pressure decrease or rarefaction which follows the surge, pressure in chamber 31 forces the sleeve inward until it lies substantially along the entire surface of the mandrel, but again, this does not result in any circumferential stretching of the sleeve.

In summary, it will be seen that the apparatus of the instant invention is well adapted to accomplish the objectives set forth hereinbefore. The sleeve 18 normally is supported by the rounded peaks of lobes or ridges 21, 22, 23 and 24, reducing frictional contact and wear of the sleeve. The sleeve 18 may, without any stretching and with no substantial distortion of its shape, occupy any position between its "free" state and a position closely adjacent the entire surface of the mandrel, thereby reducing undesired stress in the material of which the sleeve is composed.

The ratio between the area of bore 29 and the total of the areas of all the throttling orifices may be that which is deemed most desirable, and this invention is not limited to any particular ratio.

Having now described the invention, what I claim as new and desire to secure by Letters Patent, is:

1. Pulsation dampening apparatus for absorbing pressure surges in a conduit conducting fluid at fluctuating pressures, said apparatus comprising, in combination, resilient sleeve means, housing means disposed about said resilient sleeve means and providing a chamber surrounding said resilient sleeve means and chargeable with fluid at a preselected pressure, and a perforated tubular mandrel connectable with the conduit and encircled by said resilient sleeve means, said resilient sleeve means being sealingly secured adjacent its respective ends between said housing means and mandrel, said mandrel having a plurality of spaced, raised convexly curved ridges formed on the outer surface thereof for engagement by the inner surface of said resilient sleeve means for so controlling the pattern of collapse of said resilient sleeve means, when fluid pressure in said chamber exceeds that in the conduit, as to prevent the formation of sharp bends in said resilient sleeve means.

2. Pulsation dampening apparatus for absorbing pressure surges in a conduit conveying fluid at a variable pressure, said apparatus comprising, in combination, resilient sleeve means, housing means disposed about said resilient sleeve means and providing a chamber surrounding said resilient sleeve means and chargeable with fluid at a preselected pressure, and a tubular mandrel connectable with the conduit and encircled by said resilient sleeve means, said resilient sleeve means being sealingly secured adjacent its respective ends between said housing means and mandrel, said mandrel having a plurality of circumferentially spaced throttling orifices through the tubular wall thereof for exposing the inner surface of said resilient sleeve means to pressure of fluid in the conduit, said mandrel also having a plurality of spaced raised ridges that are convexly curved and extend longitudinally in a direction parallel to the axis of said mandrel and are formed on the outer surface thereof for engagement by the inner surface of said resilient sleeve means so as to cause said resilient sleeve means to collapse in a predetermined controlled pattern responsively to a reduction in pressure of fluid in the conduit below that in said chamber and also minimize the possibility of extrusion of resilient material of said resilient sleeve means through the orifices.

3. Pulsation dampening apparatus for absorbing pressure surges in a conduit conveying fluid at a variable pressure, said apparatus comprising, in combination, a tubular mandrel connectable with the conduit, said mandrel having a plurality of spaced raised convexly curved ridges formed on the outer surface thereof and said mandrel also having a plurality of throttling orifices extending radially therethrough, housing means, and resilient sleeve means disposed within said housing means and surrounding said mandrel and the ridges thereof and sealingly secured adjacent its respective ends between said housing means and mandrel, said housing means providing a chamber surrounding said resilient sleeve means and charged with fluid at a preselected pressure, the inner surface of said resilient sleeve means combining with the ridged outer surface of said mandrel to define a variable volume constantly open to the conduit via the throttling orifices, said resilient sleeve means being flexible radially outward responsively to a surge-induced increase in fluid pressure in said volume above that in said chamber to absorb said increase in fluid pressure, and said resilient sleeve means being responsive to a decrease in fluid pressure in said volume below that in said chamber, after such surge has passed, to collapse in the opposite direction in a predetermined controlled pattern corresponding to that defined by full surface contact of said sleeve means with said ridges for thereby preventing formation of sharp bends in the said resilient sleeve means upon such decrease in fluid pressure in said volume.

4. Pulsation dampening apparatus for absorbing pressure surges in a conduit conveying fluid at a variable pressure, said apparatus comprising in combination, a tubular mandrel connectable with the conduit, said mandrel having a plurality of spaced raised convexly curved ridges formed on the outer surface thereof and extending longitudinally in a direction parallel to the axis thereof, said mandrel also having intermediate said ridges a plurality of throttling orifices through the tubular wall thereof, housing means, and resilient sleeve means disposed within said housing means and surrounding said mandrel and the ridges thereof and sealingly secured adjacent its respective ends between said housing means and mandrel, said housing means providing a chamber surrounding said resilient sleeve means and charged with fluid at a preselected pressure, the inner surface of said resilient sleeve means combining with the ridged outer surface of said mandrel to define a variable volume constantly open to the conduit via the throttling orifices, said resilient sleeve means being flexible radially outward responsively to a surge-induced increase in fluid pressure in said volume above that in said chamber to absorb said increase in fluid pressure, and said resilient sleeve means being responsive to a decrease in fluid pressure in said volume below that in said chamber, after such surge has passed, to collapse in the opposite direction in a predetermined controlled pattern corresponding to that defined by surface contact of said sleeve means with said ridges for thereby preventing formation of sharp bends in the said resilient sleeve means upon such decrease in fluid pressure in said volume.

References Cited in the file of this patent

UNITED STATES PATENTS

| 2,583,231 | Ragland | Jan. 22, 1952 |

FOREIGN PATENTS

| 13,976 | Great Britain | Oct. 14, 1887 |
| 598,012 | Great Britain | Feb. 9, 1944 |